United States Patent Office 2,970,152
Patented Jan. 31, 1961

2,970,152
ANILINOBENZOQUINONE DERIVATIVES

Oscar Keller, Clifton, and Norbert Steiger, Nutley, N.J., assignors to Hoffmann-La Roche Inc., Nutley, N.J., a corporation of New Jersey No Drawing. Filed Mar. 10, 1959, Ser. No. 798,327

9 Claims. (Cl. 260—396)

This invention relates to anilinobenzoquinone derivatives. More particularly, the invention relates to the condensation products of the tert. aminoalkyl ethers of hydroxy or mercapto anilines with tetrahalo benzoquinones. Still more particularly, the invention relates to compounds represented by the structural formula (I)
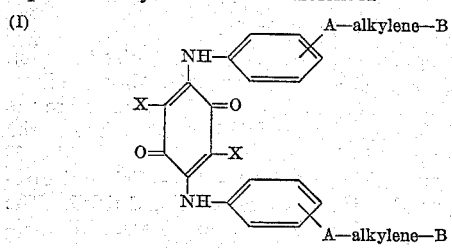

wherein A represents oxygen or sulfur, B represents a tert. amino group and X represents a halogen.

B in the above formula represents a tertiary amino group such as dialkylamino groups, preferably dilower alkylamino groups such as dimethylamino, diethylamino, dipropylamino and the like, or the nitrogen atom may be joined with polymethylene or polymethyleneoxy groups to form a 5 to 6 membered saturated heterocyclic group such as morpholinyl, piperidyl or pyrrolidyl. The alkylene groups in the above formula are divalent saturated straight chain or branched chain hydrocarbon radicals, preferably lower alkylene radicals such as methyl, ethyl, propyl, isopropyl, butyl, t.butyl, amyl, isoamyl and the like. X in the above formula represents any halogen, but bromine and chlorine, especially the latter, are preferred. Preferably both halogens are the same in a single compound.

An especially preferred group of compounds may be represented by the formula (II)
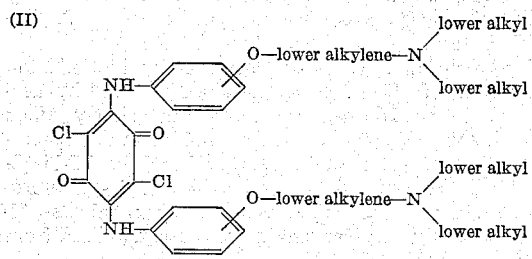

The compounds of the formula shown above are produced by dissolving a tertiary aminoalkoxy aniline or tertiary aminoalkylmercapto aniline, preferably a highly pure form such as a vacuum distilled grade, in a solvent such as alcohol and reacting at room temperature with a slurry of a tetrahalobenzoquinone, e.g. chloranil or bromanil. The dihydrochloride of the reaction product precipitates in crystalline form and may be separated from the reaction mixture. The free base may be obtained from dihydrochloride by neutralization, e.g. with an alkali metal hydroxide, such as sodium hydroxide, or an alkali metal carbonate, such as sodium carbonate.

Other acid addition salts may be produced from the free base by reaction with an excess of an inorganic or organic acid such as hydrochloric acid, phosphoric acid, nitric acid, sulfuric acid, acetic acid, citric acid, asorbic acid, salicylic acid, and the like.

The tertiary aminoalkyl ethers of hydroxy anilines used as starting materials may be produced by reacting an alkali metal salt, e.g. the sodium salt of o-, m-, or p-nitrophenol with a tertiary aminoalkyl halide, e.g. dialkylaminoalkyl halides, such as dimethylaminoethyl chloride, diethylaminoethyl chloride, morpholinylmethyl chloride, piperidylmethyl chloride, pyrrolidylethyl chloride, etc., in an inert solvent such as toluene or chlorobenzene at reflux temperature. The nitro group is then reduced with iron under conventional conditions. In the case of the mercapto anilines, an aminothiophenol may be used directly without necessity for the reduction step.

The compounds of this invention are useful against parasitic infections, particularly in animals, and may be used to combat tapeworm infestations due to the presence of parasites of the family Hymenolepis and Moniezia, e.g. *Hymenolepis fraterna*, *Hymenolepis minima*, *Hymenolepis nana* and *Moniezia expansa*. The compounds may be administered orally by incorporating therapeutic dosages in a conventional carrier and/or admixing with feedstuff.

The following examples are illustrative of the invention. All temperatures are stated in degrees centigrade.

Example 1

25 g. of chloranil were sludged with 350 ml. of alcohol. A solution of 40 g. of 4-(3-dimethylaminopropoxy)aniline in 150 ml. of alcohol was quickly run into the slurry. There was a slight exothermic reaction, the temperature rising to 40–45°. After stirring for a short while, crystallization began to occur. Stirring was continued for 4 hours at room temperature. The mixture was then chilled to 10°, filtered, and washed with a small amount of cold acetone. The product, 2,5-bis[4-(3-dimethylaminopropoxy)anilino]-3,6-dichlorobenzoquinone dihydrochloride, was recrystallized from 90% aqueous ethanol and obtained as tan crystals, M.P. 253°.

30 g. of the dihydrochloride obtained above were dissolved in 800 cc. of boiling water and filtered while hot. The filtrate was neutralized with 20% sodium carbonate solution. The free base, 2,5-bis[4-(3-dimethylaminopropoxy)anilino]-3,6-dichlorobenzoquinone, precipitated and was crystallized from toluene, M.P. 196–198°.

Example 2

16 g. of chloranil suspended in 200 ml. of alcohol were stirred with a solution of 27 g. of 4-(2-diethylaminoethoxy)aniline in 60 cc. of alcohol. After stirring 6 hours at room temperature, the condensation product precipitated and was filtered off. The product, 2,5-bis[4-(2-diethylaminoethoxy)anilino]-3,6-dichlorobenzoquinone dihydrochloride was crystallized from 90% alcohol, M.P. 285–286°.

20 g. of the dihydrochloride obtained above were dissolved in 500 ml. of boiling water and the mixture was filtered. The filtrate was neutralized with a solution of 10 g. of sodium carbonate in 100 ml. of water. The free base, 2,5-bis[4-(2-diethylaminoethoxy)anilino]-3,6-dichlorobenzoquinone was crystallized from benzene, M.P. 200–202°.

Example 3

70 g. of o-nitrophenol were dissolved in 500 ml. of chlorobenzene. 50 ml. of 40% sodium hydroxide solution were slowly added with stirring, to form a suspension of sodium salt of o-nitrophenol. The water in the reaction mixture was removed by azeotropic distillation until the temperature rose to 131°, the boiling point of chlorobenzene. After allowing the mixture to cool to 50°, 95 g. of 3-dimethylaminopropyl chloride were slowly added and the suspension was refluxed at 132° for 4 hours. The unreacted excess of the 3-dimethylaminopropyl chloride was destroyed by the addition of dilute aqueous sodium hydroxide. After cooling to room temperature, the chlorobenzene phase was separated from the aqueous phase, dried over sodium sulfate and the solvent was removed by vacuum distillation to obtain as a residue 2-(3-dimethylaminopropoxy)nitrobenzene.

106 g. of 2-(3-dimethylaminopropoxy)nitrobenzene were reduced by refluxing for 5 hours at 93° with a suspension of 200 g. of iron filings and 350 ml. of water containing 300 ml. of chlorobenzene, 8 ml. of glacial acetic acid and 5 ml. of concentrated hydrochloric acid. After neutralizing the mixture with 100 g. of sodium carbonate, it was filtered. The chlorobenzene phase was separated and the solvent was removed by vacuum distillation to obtain as a residue, 2-(3-dimethylaminopropoxy)aniline.

50 g. of chloranil were suspended in 600 ml. of ethanol. To the mixture was slowly added a solution of 80 g. of 2-(3-dimethylaminopropoxy)aniline in 200 ml. of ethanol with stirring. After stirring for 4 hours at room temperature, the mixture was cooled to 5°. 2,5-bis[2-(3-dimethylaminopropoxy)anilino]-3,6-dichlorobenzoquinone dihydrochloride precipitated and was filtered off and dried. The product was crystallized from ethanol-ether, M.P 240°.

25 g. of the dihydrochloride obtained above were dissolved in 500 ml. of water containing 5 ml. of concentrated hydrochloric acid. The solution was heated to the boiling point, filtered and a solution of 10 g. of sodium carbonate in 80 ml. of water was added. The free base, 2,5 - bis[2 - (3 - dimethylaminopropoxy)anilino] - 3,6 - dichlorobenzoquinone, precipitated, was filtered off and crystallized from benzene-petroleum ether, M.P. 176–178°.

Example 4

37 g. of chloranil were suspended in 450 ml. of ethanol. 54 g. of 2-(2-dimethylaminoethoxy)aniline, dissolved in 150 ml. of ethanol, were slowly added with stirring. After stirring for 4 hours at room temperature, the reaction mixture was cooled to 5° and the product which separated was filtered off and dried. The 2,5-bis[2 - (2 - dimethylaminoethoxy)anilino] - 3,6 - dichlorobenzoquinone dihydrochloride was crystallized from ethanol-ether, M.P. 231–232°.

25 g. of the dihydrochloride obtained above were dissolved in 500 ml. of water containing 5 ml. of concentrated hydrochloric acid. The solution was heated to boiling and filtered. A solution of 10 g. of sodium carbonate in 80 ml. of water was added to the filtrate. The base, 2,5 - bis[2 - (2 - dimethylaminoethoxy)anilino] - 3,6 - dichlorobenzoquinone, precipitated in crystalline form and was filtered off and dried. The product was recrystallized from benzene-petroleum ether, M.P. 185–187°.

Example 5

37 g. of chloranil were suspended in 450 ml. of ethanol. 77 g. of 2 - (3 - diethylamino - 2,2 - dimethylpropoxy)aniline, dissolved in 150 ml. of ethanol, were slowly added to the mixture with stirring. After stirring for 9 hours at room temperature, the reaction mixture was stored in the refrigerator overnight. The crystalline 2,5 - bis[2 - (3 - diethylamino - 2,2 - dimethylpropoxy) anilino]-3,6-dichlorobenzoquinone dihydrochloride which precipitated was filtered off and dried. The product was recrystallized from ethanol-ether, M.P. 245–247°.

29 g. of the dihydrochloride obtained above were dissolved in 600 ml. of water containing 6 ml. of concentrated hydrochloric acid. The solution was heated to boiling, filtered and 65 ml. of 20% sodium carbonate solution were added to the filtrate. The crystalline base, 2,5 - bis[2-(3-diethylamino-2,2-dimethylpropoxy)anilino]-3,6-dichlorobenzoquinone, was filtered off and dried. The product was recrystallized from benzene-petroleum ether, M.P. 100–102°.

Example 6

35 g. of chloranil were suspended in 450 ml. of ethanol. A solution of 55 g. of 2-(2-dimethylamino-1-methylethoxy)aniline dissolved in 150 ml. of ethanol were added slowly with stirring. After stirring for 7 hours at room temperature, the mixture was cooled in ice and the precipitated 2,5-bis[2-(2-dimethylaminoisopropoxy)anilino]-3,6-dichlorobenzoquinone dihydrochloride was filtered off and dried. The product was crystallized from ethanol-ether, M.P. 270–272°.

25 g. of the dihydrochloride obtained above were dissolved in 500 ml. of water containing 5 ml. of concentrated hydrochloric acid. The solution was heated to boiling and filtered. 60 ml. of 20% sodium carbonate solution were added to the filtrate and the free base, 2,5-bis[2-(2-dimethylaminoisopropoxy)anilino]-3,6-dichlorobenzoquinone, precipitated in crystalline form and was filtered off and dried. The product was recrystallized from benzene-petroleum ether, M.P. 136–138°.

Example 7

27 g. of chloranil were suspended in 350 ml. of ethanol. A solution of 43 g. of 3-(2-dimethylaminoethoxy)aniline, dissolved in 150 ml. of ethanol, was slowly added to the mixture with stirring. After stirring for 4 hours, the mixture was cooled in ice and the precipitated 2,5-bis[3-(2 - diethylaminoethoxy)anilino] - 3,6 - dichlorobenzoquinone dihydrochloride was filtered off and dried. The product was recrystallized from ethanol-ether, M.P. 216–218°.

35 g. of the dihydrochloride obtained above were dissolved in 700 ml. of water containing 7 ml. of concentrated hydrochloric acid. The solution was heated to boiling and filtered. 90 ml. of 20% sodium carbonate solution were added to the filtrate. The crystalline base, 2,5-bis[3-(2-dimethylaminoethoxy)anilino]-3,6 - dichlorobenzoquinone, precipitated, was filtered off and dried. Upon recrystallization from benzene-petroleum ether, the product melted at 135–136°.

Example 8

80 g. of the zinc salt of 2-aminothiophenol were condensed with 75.3 g. of 2-dimethylaminoethyl chloride in chlorobenzene by refluxing at 132° for 4 hours. The unreacted excess 2-dimethylaminoethyl chloride was destroyed with aqueous sodium carbonate and the 2-(2-dimethylaminoethylmercapto)aniline separated in the chlorobenzene solution. The solvent was distilled off to obtain crude 2 - (2 - dimethylaminoethylmercapto)aniline which was purified by vacuum distillation, B.P. 98–101°/0.02 mm. Hg.

32 g. of chloranil were suspended in 300 ml. of ethanol. A solution of 49 g. of 2-(2-dimethylaminoethylmercapto)aniline in 200 ml. of ethanol were slowly added with stirring. After stirring for 8 hours at room temperature, the mixture was cooled to 5° and the 2,5-bis[2-(2 - dimethylaminoethylmercapto)anilino]-3,6 - dichlorobenzoquinone dihydrochloride which separated was filtered off and dried. The product was recrystallized from ethanol-ether, M.P. 235–236°.

23 g. of the dihydrochloride obtained above were dissolved in 500 ml. of water containing 5 ml. of concentrated hydrochloric acid. The solution was heated to the boiling point and filtered. 55 ml. of a 20% sodium carbonate solution were added to the filtrate and the free base percipitated. The 2,5-bis[2-(2-dimethylaminoethylmercapto)anilino]-3,6-dichlorobenzoquinone was recrystallized from benzene-petroleum ether, M.P. 189–191°.

Example 9

63 g. of 2-aminothiophenol were converted to the sodium salt with 55 ml. of 40% aqueous sodium hydroxide in chlorobenzene. After removing the water by distillation, the suspension of the sodium salt was condensed with 3-dimethylaminopropyl chloride according to the procedure described in the first paragraph of Example 8. The 2-(3-dimethylaminopropylmercapto)aniline boiled at 105–106°/0.02 mm. Hg.

55 g. of chloranil were suspended in 500 ml. of ethanol. A solution of 92 g. of 2-(3-dimethylaminopropylmercapto)aniline in 250 ml. of ethanol was slowly added with stirring. After stirring for 8 hours at room temperature, the mixture was cooled to 5° and the product which separated was filtered off and dried. The 2,5-bis[2-(3 - dimethylaminopropylmercapto)anilino]-3,6-dichlorobenzoquinone dihydrochloride was crystallized from ethanol, M.P. 227–228°.

25 g. of the dihydrochloride obtained above were dissolved in 600 ml. of water containing 6 ml. of concentrated hydrochloric acid. The solution was heated to the boiling point and filtered. 70 ml. of 20% sodium carbonate solution were added to the filtrate and 2,5-bis[2-(3-dimethylaminopropylmercapto)anilino] - 3,6 - dichlorobenzoquinone precipitated. The product was recrystallized from benzene-Skellysolve B, M.P. 183–184°.

*Example 10*

45 g. of chloranil were suspended in 450 ml. of ethanol. A solution of 67 g. of 3-(3-dimethylaminopropoxy)aniline were slowly added to the suspension with stirring. After stirring for for 5 hours at room temperature the mixture was cooled to 5° and the 2,5-bis[3-(3-dimethylaminopropoxy)anilino] - 3,6 - dichlorobenzoquinone dihydrochloride which precipitated was filtered off and dried. The product was crystallized from ethanol-ether, M.P. 235–237°.

25 g. of the dihydrochloride obtained above were dissolved in 500 ml. of water containing 5 ml. of concentrated hydrochloric acid. The solution was heated to the boiling point and filtered. 70 ml. of 20% sodium carbonate solution were added to the filtrate. The precipitated 2,5-bis[3-(3-dimethylaminopropoxy)anilino]-3,6-dichlorobenzoquinone was filtered and crystallized from benzene-petroleum ether, M.P. 150–151°.

We claim:

1. A member of the group consisting of a compound of the formula

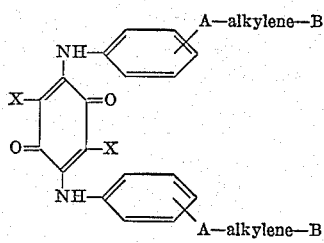

wherein A represents a member of the group consisting of oxygen and sulfur, B represents a tertiary amino group selected from the group consisting of di-lower alkylamino, piperidyl, morpholinyl and pyrrolidyl, and X represents halogen, and pharmacologically acceptable acid addition salts thereof.

2. A compound represented by the formula

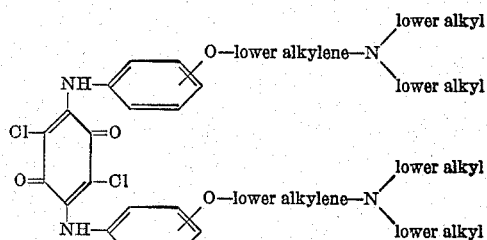

3. A compound represented by the formula

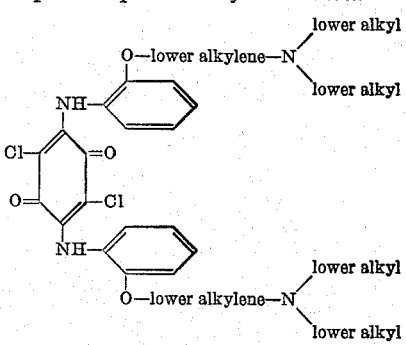

4. A compound represented by the formula

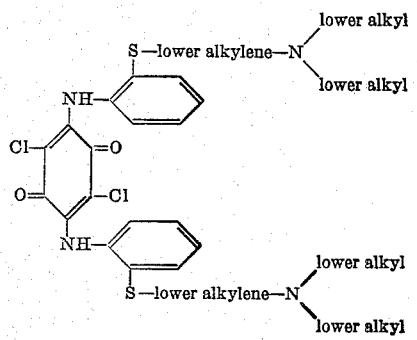

5. 2,5-bis[2-(3-dimethylaminopropyl)anilino]-3,6 - dichlorobenzoquinone.

6. 2,5-bis[2-(3-dimethylaminopropoxy)anilino]-3,6-dichloro benzoquinone dihydrochloride.

7. 2,5-bis[2-(2-dimethylaminoethoxy)anilino]-3,6 - dichlorobenzoquinone.

8. 2,5 - bis[2-(2-dimethylaminoethylmercapto)anilino]-3,6-dichlorobenzoquinone.

9. 2,5-bis[2-(3-dimethylaminopropylmercapto)anilino]-3,6-dichlorobenzoquinone.

References Cited in the file of this patent

UNITED STATES PATENTS 2,881,173   Wenner _____ Apr. 7, 1959

UNITED STATES PATENT OFFICE
CERTIFICATION OF CORRECTION

Patent No. 2,970,152                 January 31, 1961

Oscar Keller et al.

It is hereby certified that error appears in the above numbered patent requiring correction and that the said Letters Patent should read as corrected below.

Column 2, line 4, for "asorbic" read -- ascorbic --; column 6, line 45, for "dimethylaminopropyl" read -- dimethylaminopropoxy --; lines 47 and 48, for "dichloro benzoquinone" read -- dichlorobenzoquinone --.

Signed and sealed this 25th day of July 1961.

(SEAL)
Attest:

ERNEST W. SWIDER                              DAVID L. LADD
Attesting Officer                                Commissioner of Patents